(No Model.) 2 Sheets—Sheet 1.

W. B. & E. ROBINSON.
PROCESS OF MAKING SURGICAL BANDAGES.

No. 378,178. Patented Feb. 21, 1888.

Witnesses
Baltis D. Long
Allan McL. Abel

Inventors
W. B. Robinson,
E. Robinson,
Baldwin, Hopkins & Peyton (No Model.) 2 Sheets—Sheet 2.
W. B. & E. ROBINSON.
PROCESS OF MAKING SURGICAL BANDAGES.
No. 378,178. Patented Feb. 21, 1888.
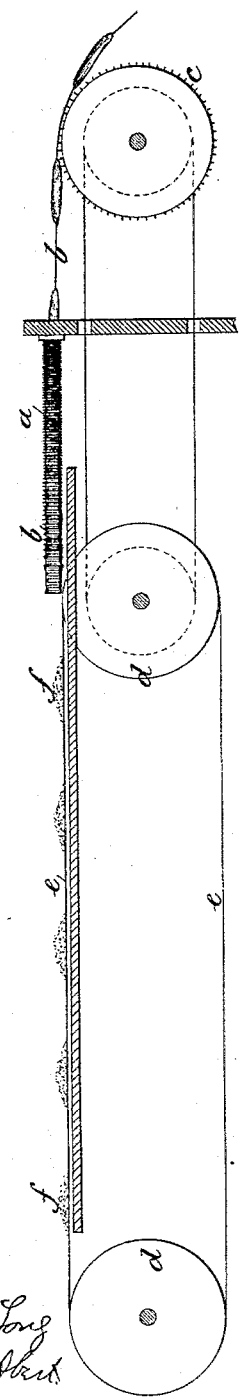
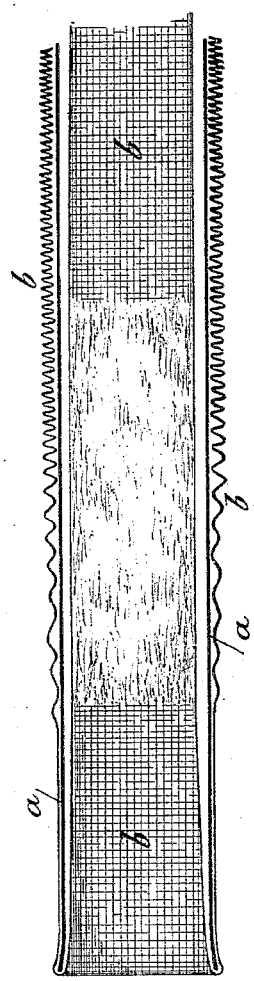
Witnesses
Baltis D. Long
Allan M. L. Abit
Inventors
W. B. Robinson
E. Robinson
By attys
Baldwin, Hopkins & Peyton

UNITED STATES PATENT OFFICE.

WILLIAM BRADBURY ROBINSON AND ELIZABETH ROBINSON, OF BRAMPTON, COUNTY OF DERBY, ENGLAND; SAID ELIZABETH ROBINSON ASSIGNOR TO SAID WILLIAM BRADBURY ROBINSON.

PROCESS OF MAKING SURGICAL BANDAGES.

SPECIFICATION forming part of Letters Patent No. 378,178, dated February 21, 1888.

Application filed August 8, 1887. Serial No. 246,423. (No model.)

*To all whom it may concern:*

Be it known that we, WILLIAM BRADBURY ROBINSON, lint, cotton, wool, and bandage manufacturer, and ELIZABETH ROBINSON, spinster, subjects of the Queen of Great Britain, both residing at Brampton, in the county of Derby, England, have invented certain new and useful Improvements in the Process for the Manufacture of Pads and Bandages for Medical and other Purposes, of which the following is a specification.

In an application lodged by one of us—viz., the said William Bradbury Robinson—on the 7th day of August, 1886, Serial No. 210,376, was described a medical bandage consisting of a tubular fabric filled from end to end with cotton, wool, or other material.

The present application relates to a process for making an article which differs only from that described in the said former application in that the cotton, wool, or other material does not necessarily extend continuously from end to end of the tubular fabric, but may be divided into a number of separate pads.

Figure 2:
Figure 1:
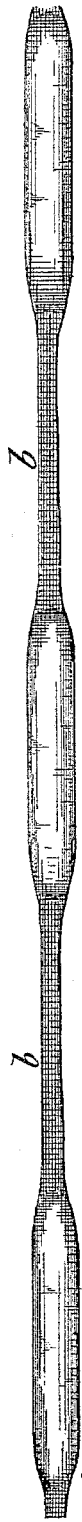

Figure 1 is a side elevation, and Fig. 2 is a plan, of the article to be manufactured. Fig. 3 is a general view of the apparatus for producing the article; and Fig. 4 is a vertical longitudinal section of the tube $a$, Fig. 3.

$a$ is a tube, Fig. 4. This tube is of any suitable length—say from four to ten feet. It is preferably of an oval section. The tubular fabric $b$, (many yards in length,) from which the series of bandages, Figs. 1 and 2, are to be made, is collected on the outside of this tube, as shown in Fig. 4, as woven and without being previously turned inside out. One end of the tubular fabric is then taken inside the tube and pulled through it to the other end, causing the tubular fabric to be turned inside out as it is being filled with absorbent material. This may readily be done by fastening the fabric to a tape which has previously been passed through the tube. The end of the tubular fabric thus drawn through the tube is carried over the drawing-roller $c$, Fig. 3. $d\ d$ are a pair of rollers carrying an endless band, $e$. The three rollers $c$, $d$, and $d$ are all driven at the same surface speed.

Tufts or pads of medicated cotton, wool, or other material, $f\ f$, are placed, by hand or otherwise, at regular intervals apart upon the endless band $e$, and are carried by it up to the mouth of the tube $a$. As soon as they arrive at the mouth of the tube they are taken hold of by the tubular fabric and are drawn by it through the tube, thus forming the continuous length of bandages shown in Figs. 1 and 2, and can be afterward cut in the center of the unfilled tubular fabric, or wherever desired, to make separate pads.

The process and apparatus, as above described, although especially adapted for the manufacture of the article shown in Figs. 1 and 2, is also applicable to the manufacture of bandages with a continuous filling, as described in said former application.

What we claim is—

The process of manufacturing pads and bandages, consisting in collecting a length of tubular fabric on the outside of a tube and drawing it off through the inside of the tube while cotton, wool, or other material is introduced into it either intermittently or continuously, substantially as described.

WILLIAM BRADBURY ROBINSON.
ELIZABETH ROBINSON.

Witnesses:
RICHARD THOMAS GRATTON,
*No. 7 Knifesmith Gate, Chesterfield, England, Solicitor.*
EDWARD SCHOFIELD,
*Compton Street, Chesterfield, England, Law Clerk.*